Dec. 13, 1938.  J. H. McELROY ET AL  2,140,023
SHEET FEEDER
Filed June 15, 1937   7 Sheets-Sheet 1

Fig. 1

INVENTORS
JOHN H. McELROY
EDWARD J. YEO
FREDERICK G. BINDER

BY  *J. A. Hobson Jr.*
ATTORNEY

Dec. 13, 1938.     J. H. McELROY ET AL     2,140,023
SHEET FEEDER
Filed June 15, 1937     7 Sheets-Sheet 2

Fig. 2

INVENTORS
JOHN H. McELROY
EDWARD J. YEO
FREDERICK G. BINDER
BY J.A. Hobson Jr.
ATTORNEY

Dec. 13, 1938.    J. H. McELROY ET AL    2,140,023
SHEET FEEDER
Filed June 15, 1937    7 Sheets-Sheet 7

INVENTORS
JOHN H. McELROY
EDWARD J. YEO
FREDERICK G. BINDER
BY
J. W. Hobson Jr.
ATTORNEY Patented Dec. 13, 1938

2,140,023

UNITED STATES PATENT OFFICE 2,140,023

SHEET FEEDER

John H. McElroy and Edward J. Yeo, Pearl River, N. Y., and Frederick G. Binder, Philadelphia, Pa., assignors to Dexter Folder Company, New York, N. Y., a corporation of New York Application June 15, 1937, Serial No. 148,380

35 Claims. (Cl. 271—31)

This invention relates to sheet feeders and while capable of general use is particularly adapted for embodiment in feeders for feeding sheets of cardboard or other relatively stiff material to printing presses, cutting and creasing machines, and various other instrumentalities operating on material of this character.

One object of the present invention is to provide an improved feeder that will separate and feed cardboard or other relatively stiff material from a pile more rapidly and efficiently than sheet feeders heretofore employed for this purpose.

Another object of the present invention is to provide an improved feeder having a relatively small number of parts of simple and durable construction requiring little if any attention by the attendant.

Another object of the present invention is to provide a feeder having improved sheet winding and hold down devices so constructed that compressed air may be utilized to operate said devices.

Another object of the present invention is to provide a feeder having improved means for rapidly operating the elevator automatically at different speeds to load it.

Another object of the present invention is to provide a feeder having a common drive for the rapid elevator operating means and the vacuum and air supplying pump, with means for selectively controlling the operation of the same.

These and other objects of the present invention will appear as the following description thereof proceeds and in order to more clearly understand said invention reference may be had to the accompanying drawings which illustrate one embodiment thereof.

Referring to the drawings, wherein like reference characters designate like parts throughout the several views, the various movable parts of the feeder as well as certain stationary parts thereof may be mounted on a frame of any suitable construction and the movable parts may be actuated or driven by any suitable means. As herein shown, said frame and driving means are preferably constructed as follows.

The feeder frame is comprised by a pair of front heads 5 and a pair of rear heads 6 connected together by side members 7 (Figs. 1 to 5). The front heads 5 and the rear heads 6 are bolted or otherwise suitably secured to, and supported by, upright posts or standards 8 which, in turn, are bolted or otherwise suitably secured to the machine foundation, the front heads 5 being connected together by stay shafts 9 bolted or otherwise suitably secured thereto, and the rear heads 6 being connected together by a stay shaft 10.

Figure 1:
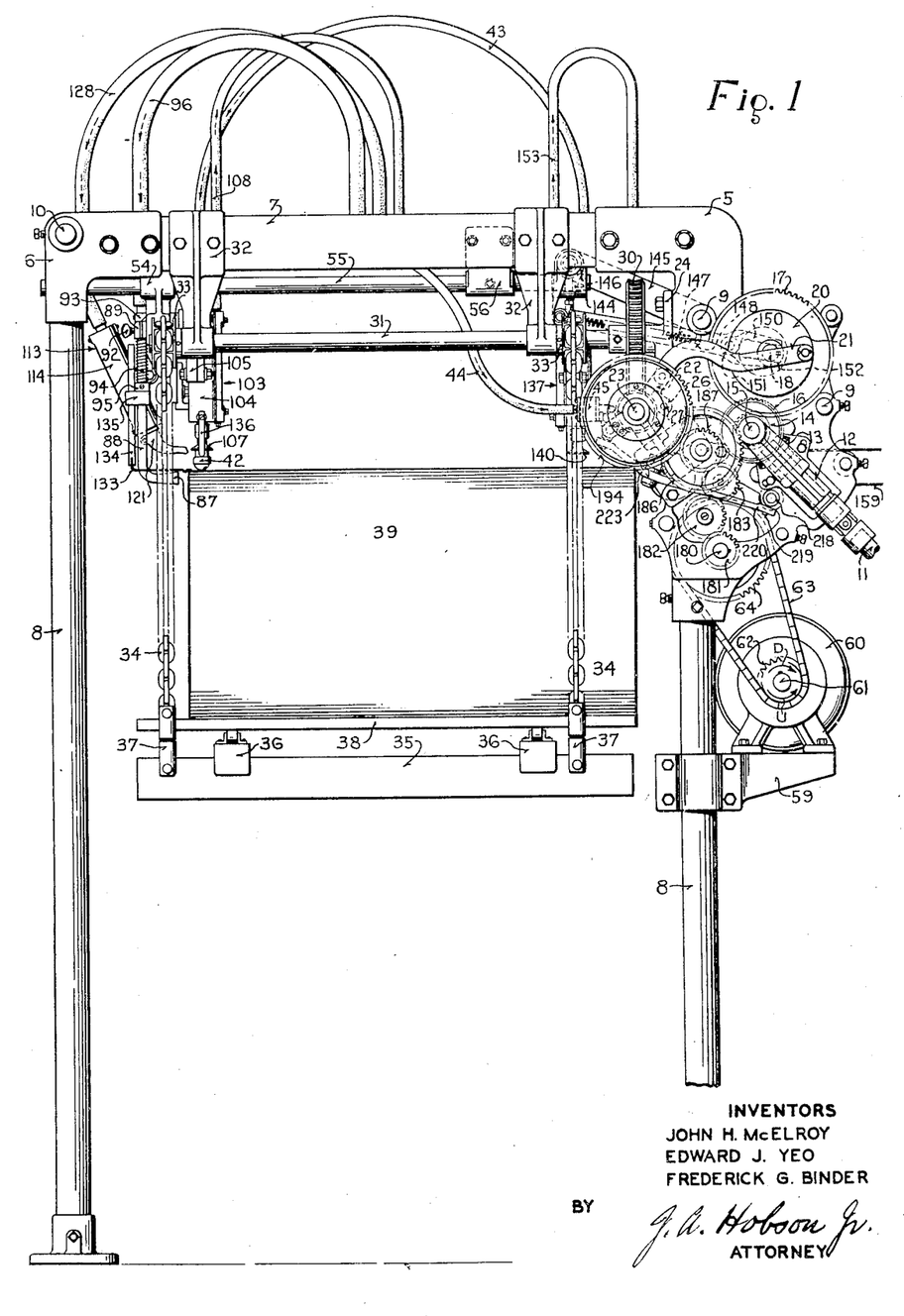
Fig. 1 is a side elevation of the feeder embodying the present invention and particularly adapted to feed sheets of cardboard.
Figure 2:
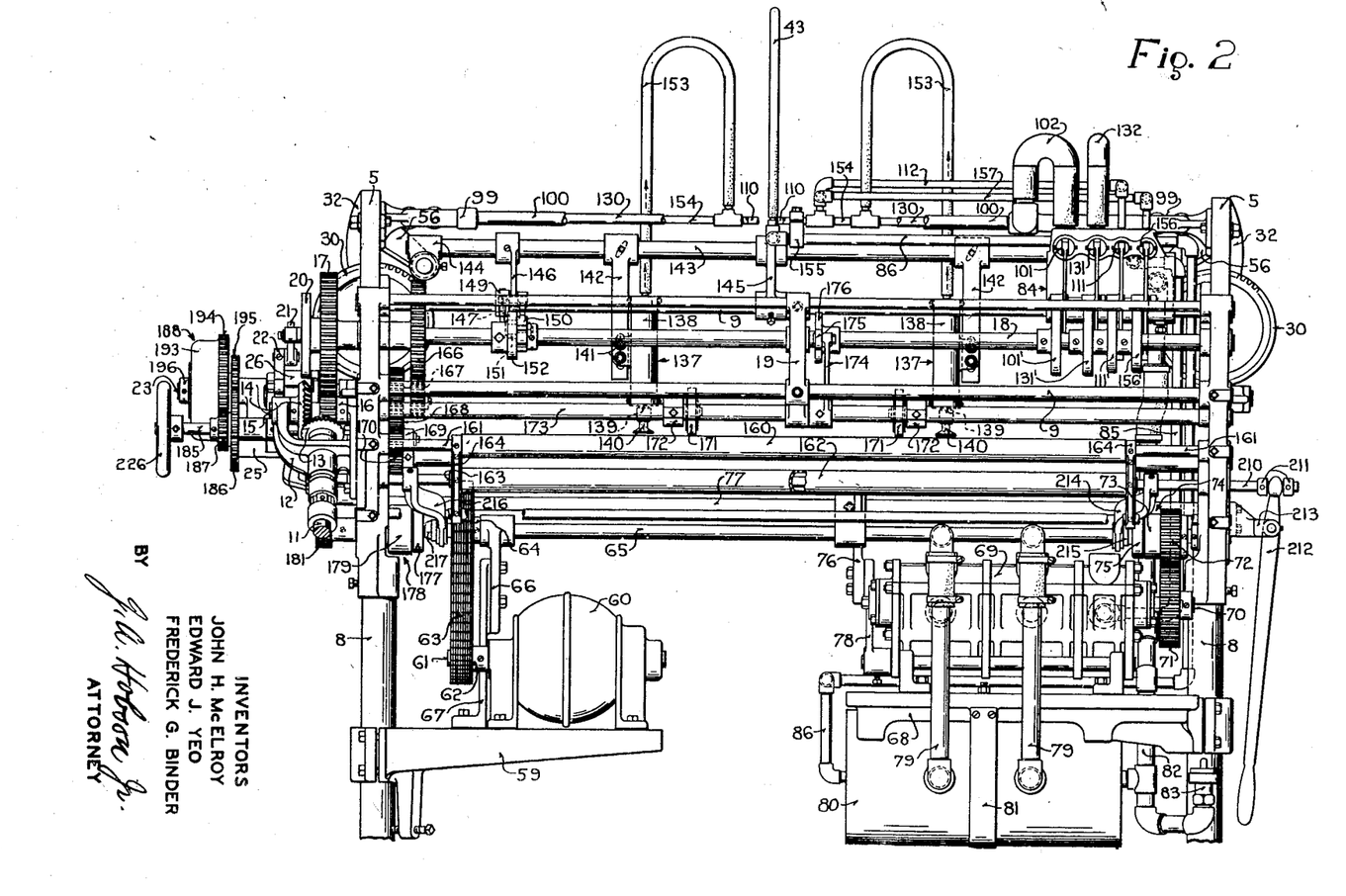
Figs. 2 and 3 are front and rear elevations respectively of the feeder shown in Fig. 1.

Referring now more particularly to Figs. 1 and 2, the drive for the feeder is preferably comprised by an inclined driven jack shaft 11 which, in turn, is driven from any suitable source of power (not shown). The upper end of this jack shaft 11 is journalled in a suitable bearing in a bracket 12 which is bolted or otherwise suitably secured to one of the front heads 5.

Fixed on the upper end of the jack shaft 11 is a bevel gear 13 which meshes with a similar gear 14 fixed on a short shaft 15 journalled in suitable bearings in the bracket 12 and the adjacent front head 5. Also fixed on the short shaft 15 is a spur pinion 16 which meshes with a spur gear 17 fixed on a cam shaft 18 extending transversely of the feeder and journalled in suitable bearings in the front heads 5 and also in a center bracket 19 that is bolted or otherwise suitably secured to the stay shafts 9. The feeder includes a pile elevator and operating mechanism therefor preferably constructed as follows.

Figure 3:
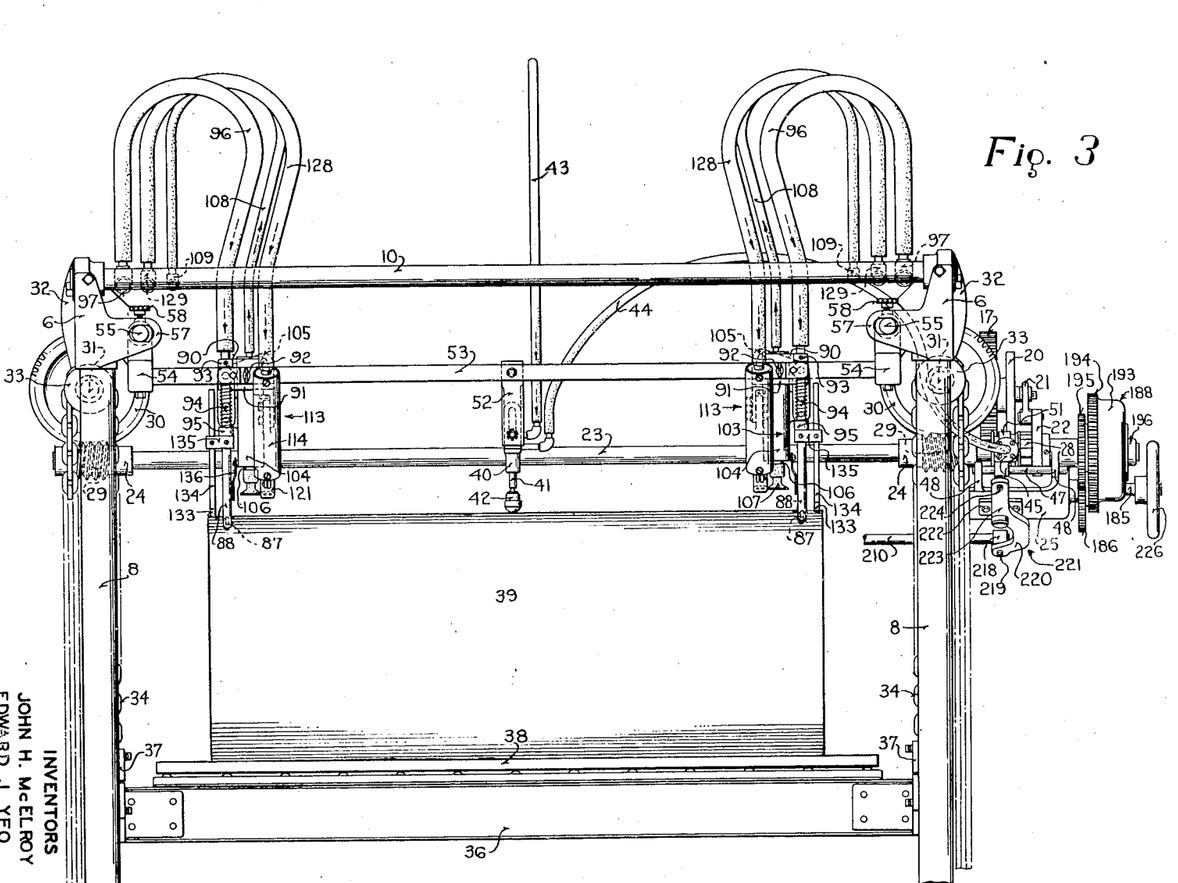

Secured to or formed integrally with gear 17 is a crank disc 20 pivotally connected with one end of a link 21 the opposite end of which is pivotally connected with a pawl carrier 22 that is loosely mounted on one end of a shaft 23 (Fig. 3). This shaft 23 extends transversely of the feeder and is journalled in suitable bearings in brackets 24 (Figs. 1 and 3) bolted or otherwise suitably secured to the front heads 5. Shaft 23 also has a bearing in a bracket 25 that is bolted or otherwise suitably secured to one of the front heads 5. The shaft 23 is operated at suitable intervals to raise the pile elevator hereinafter described and said operation of said shaft is preferably effected by pawl and ratchet mechanism of the general type disclosed in the application of Leonard Baker, George A. Martin, and Leo C. Williams, Serial No. 116,692, filed Dec. 19, 1936.

This pawl and ratchet mechanism includes a pawl carrier such as indicated at 22 (Figs. 1 to 3) having a pawl 26 pivoted thereon at 27 and adapted, under certain conditions, to engage a ratchet 28 fixed on the shaft 23. It will thus appear that through oscillation of the pawl carrier 22 by the described driving connections therefor and engagement of the oscillating pawl 26 with the ratchet 28, the shaft 23 will be intermittently rotated. Fixed on the shaft 23 are right and left hand worms 29 (Fig. 3) which mesh with right and left hand worm gears 30 that are fixed on shafts 31 (Figs. 1 and 5) journalled in suitable bearings provided by the brackets 24 on the front heads 5 and brackets 32 bolted or otherwise suitably secured to the side members 7. Fixed on shafts 31 are toothed sheaves 33 in the teeth of which are engaged links of chains 34. When the shafts 31 are rotated in the proper direction by the described driving means therefor chains 34 will be raised and thus raise an elevator comprising side bars 35 and cross beams 36 supported by, and slidable along, the bars 35, the lower ends of said chains being secured as by suitable couplings or connections 37 to the side bars 35. The cross beams 36 have placed thereon a pile board 38 which, together with a pile of cardboard or other sheets 39, is positioned on said beams through the rear of the feeder when the elevator is lowered by means for this purpose hereinafter described.

The elevator and pile of sheets thereon are raised intermittently by the described means for this purpose as sheets are fed off the top of said pile by vacuum operated suction separating and forwarding devices hereinafter described. To keep the top of said pile at a predetermined level for the operation of said devices any suitable means may be employed to control the operation of the elevator but as herein shown said means is preferably of the type disclosed in the above mentioned application Serial No. 116,692.

Figure 5:
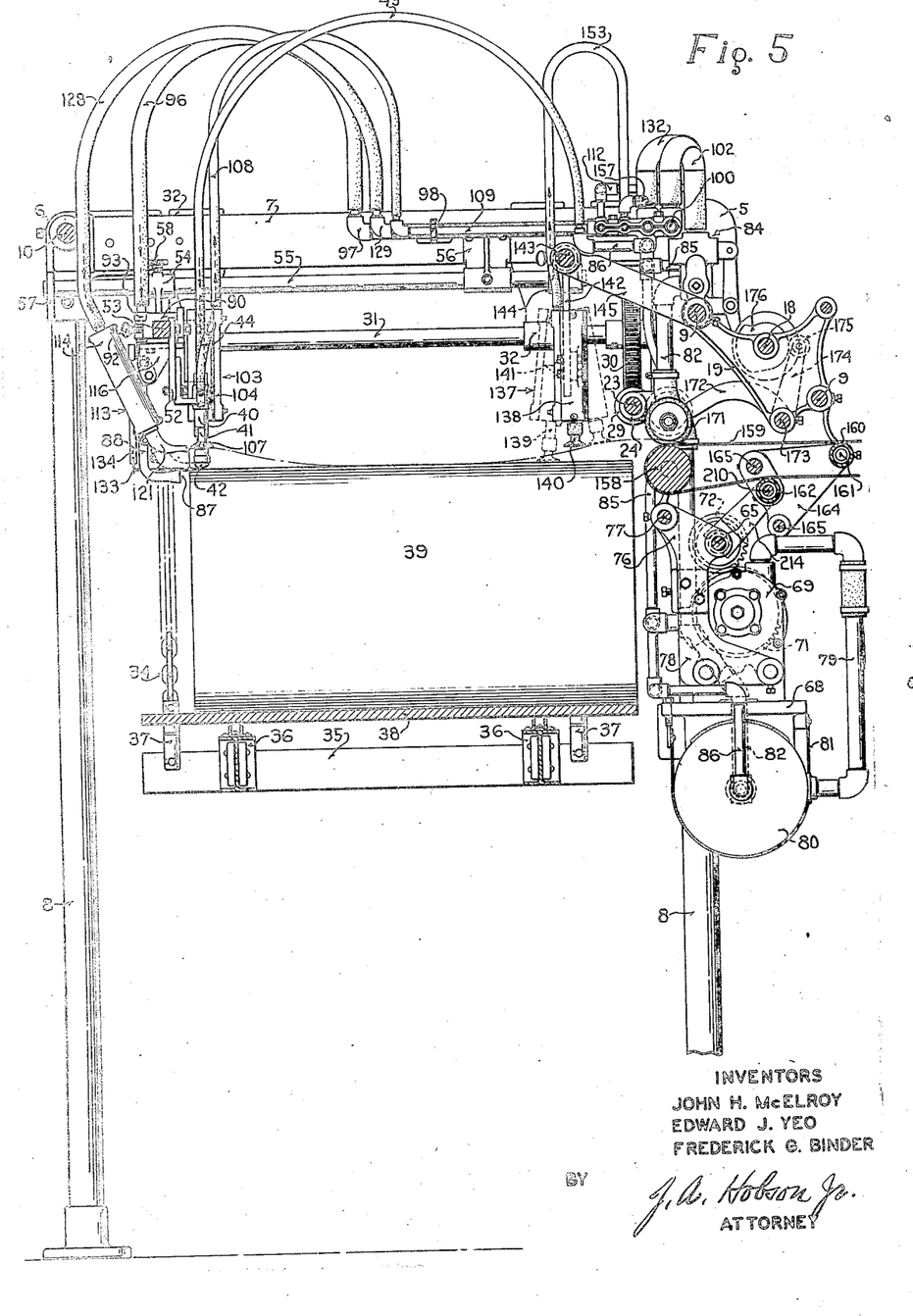
Fig. 5 is a vertical longitudinal sectional view of the feeder shown in Figs. 1 to 4.
Figure 14:
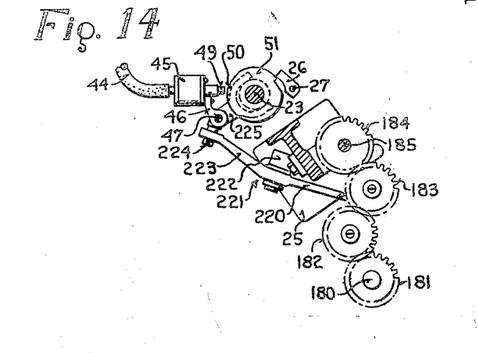
Fig. 14 is an enlarged side elevation partly in section showing the gear drive for the two speed elevator operating mechanism, and the means for disconnecting the pawl and ratchet mechanism.

Referring to Figs. 3 and 5, this control mechanism includes a valve housing 40 having a valve 41 slidably mounted therein and provided on the lower end thereof with a socket and ball 42 that rests on the top of the pile of sheets 39. As sheets are fed one after another from the top of the pile, the valve 41 will lower by gravity and when a sufficient number of sheets have been so fed, the valve will establish communication between a flexible conduit 43 and a flexible conduit 44. The conduit 43 is connected with the housing 40 and a source of compressed air to be hereinafter described. The conduit 44 is connected with the housing 40 and with a plunger housing 45 (Figs. 1, 3 and 14). The plunger housing 45 is carried on a bracket 46 bolted or otherwise suitably secured to a short shaft 47 that is slidably mounted, for a purpose to be hereinafter described, in lugs or ears 48 (Fig. 3) formed on the bracket 25.

When air under pressure is admitted in conduit 44, the air enters the plunger housing 45 and actuates a spring pressed piston therein to force a stem 49 (Fig. 14) into the path of a shoulder 50 formed on a pawl mask 51 freely mounted on, and slidable along, the shaft 23. As described in the pending application previously referred to, this mask 51 normally oscillates together with the pawl carrier 22 through connections provided for this purpose and holds the pawl 26 out of engagement with the ratchet 28. When the mask 51 is stopped through engagement of the stem 49 with the shoulder 50 thereon as previously described, the pawl 26 through continued oscillation of the pawl carrier 22 will ride off said mask and engage the ratchet 28. The shaft 23 will then be actuated intermittently by the pawl and ratchet mechanism, and through the described connections for said shaft with the elevator, the latter and the pile of sheets will be raised until the top of the pile is at the proper height at which time the valve 41 lifted by the raised pile disconnects the source of air under pressure from the plunger housing 45. The spring for stem 49 then disengages said stem from the shoulder 50 on mask 51 and the latter is turned to lift and hold the pawl 26 out of engagement with the ratchet 28 until further elevation of the pile is neecssary.

Figure 4:
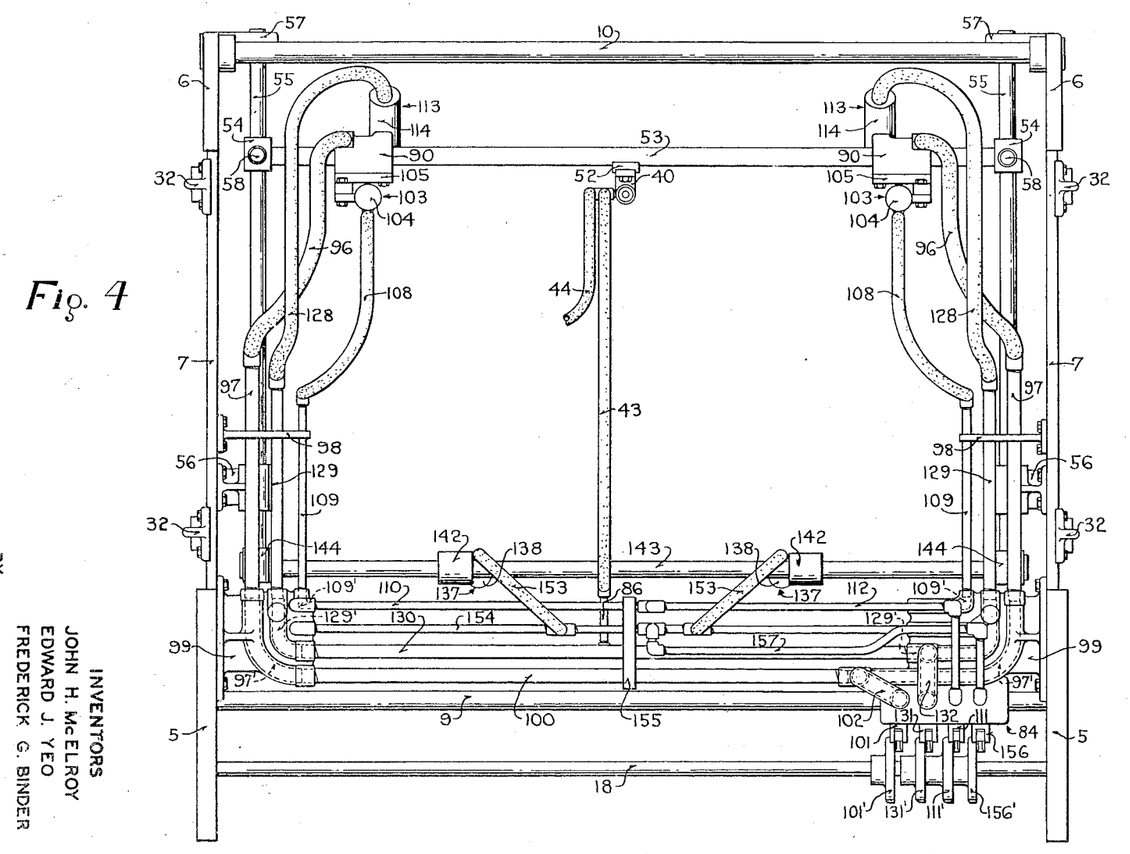
Fig. 4 is a top plan view of said feeder with parts omitted for purposes of clearer illustration.

The valve housing 40 is adjustably mounted in a bracket 52 which is bolted or otherwise suitably secured to a rear cross bar 53 (Figs. 3 and 4). This cross bar 53 is bolted or otherwise suitably secured to brackets 54 slidably mounted on side bars 55 which are secured near the forward ends thereof in brackets 56 bolted or otherwise suitably secured to the side members 7, the rear ends of said bars being supported in extensions 57 formed on the rear heads 6. The cross bar 53 and parts carried thereby are therefore adjustable forwardly and rearwardly along side bars 55 and may be secured in any desired position of adjustment thereon by thumb screws 58 or the like.

Referring now to Figs. 1, 2 and 5 the feeder has a source of compressed air and vacuum, and driving means therefor, which are preferably mounted, constructed and operated as follows. Clamped or otherwise suitably secured to one of the front posts or standards 8 is a platform 59 to which is bolted or suitably secured an electric motor 60 connected with a suitable source of current and controlled for starting, stopping and reversing purposes by suitable switch means (not shown). Fixed on the armature shaft 61 of motor 60 is a sprocket 62 around which passes a chain 63 that also passes around a sprocket 64 that is fixed on a shaft 65. This shaft 65 extends transversely of the feeder and is journalled in a suitable bearing in one of the front heads 5 and in a suitable bearing in a bracket 66 (Fig. 2) that is adjustably mounted in a bracket 67 which, in turn, is bolted or otherwise suitably secured to the platform 59.

Clamped or otherwise suitably secured to the front post or standard 8 at the opposite side of the feeder is a platform 68 which has bolted or otherwise suitably secured thereto a pump 69 suitably constructed to supply air under pressure from one part thereof and to create vacuum in another part thereof. Fixed on the shaft 70 of pump 69 is a spur gear 71 which meshes with a similar gear 72. This gear 72 and a part 73 of a clutch indicated broadly at 74 (Fig. 2) are secured to or formed integrally with each other and loosely mounted on the shaft 65. The clutch 74 is of well known construction needing no detailed description herein and includes another part 75 which is fixed on the shaft 65. The shaft 65 is supported intermediate the ends thereof by a bracket 76 (Figs. 2 and 5) that is bolted or otherwise suitably secured to a shaft 77 extending transversely of the feeder and fixed in the front heads 5. The bracket 76 is also adjustably mounted on a bracket 78 that is bolted or otherwise suitably secured to the pump 69.

The exhaust or air pressure side of the pump 69 has connected therewith corresponding ends of conduits 79 the opposite ends of which are connected with a compressed air tank 80 disposed beneath the platform 68 and clamped thereto by a strap 81 passing around the tank and adjustably secured to said platform. The compressed air tank 80 has connected therewith one end of a conduit 82 (Figs. 2 and 5) in which is located a valve 83 for controlling the pressure of air delivered from the tank through said conduit to the parts hereinafter described and connected therewith. The opposite end of the conduit 82 is connected with a multiple valve mechanism indicated broadly at 84 (Fig. 2) which is mounted on the upper stay shaft 9 and controls both the air pressure actuated and vacuum actuated parts of the feeder that will be later described. This multiple valve mechanism 84 is preferably of the type disclosed in Patent No. 1,606,016, C. E. Christophel, November 9, 1926. The multiple valve mechanism 84 has connected therewith one end of a conduit 85 the opposite end of which is connected to the vacuum side or part of the pump 69. Air under pressure is continuously maintained in the flexible conduit 43 through a conduit 86 (Figs. 2 and 5) having one end connected with the compressed air tank 80 and the opposite end connected with said conduit 43.

The sheets of pile 39 are separated one after another at the rear by suction separating devices to be later described, but before this operation takes place the rear upper corners of the pile are winded to preliminarily separate the upper sheets of the pile by compressed air that is directed through the vertically disposed elongated nozzles 87 of blow pipes 88 (Figs. 1 and 3 to 7). These blow pipes 88 are loosely mounted in suitable openings of bosses 89 formed in brackets 90 (Figs. 6 and 7) engaged over the rear cross bar 53 and held against displacement therefrom by cover plates 91 bolted or otherwise suitably secured to the underside of said brackets. The brackets 90 and parts carried thereby are adjustable along the bar 53 toward and away from each other to accommodate various sizes of sheets and may be secured in any desired position of adjustment on said bar by thumb screws 92 or the like.

The blow pipes 88 are provided on the tops thereof above the brackets 90 with locking and adjusting collars 93 by means of which the pipes may be adjusted vertically to the desired position for action on the upper rear corner portions of the pile of sheets 39. In order to maintain the blow pipes 88 in the desired position of adjustment, they have mounted thereon below the brackets 90 springs 94 the upper ends of which bear against the brackets 90 and the lower ends of which bear against adjusting collars 95 which are secured to the blow pipes and may be adjusted to regulate the tension of said springs. The upper ends of the blow pipes 88 have connected therewith corresponding ends of flexible conduits 96 the opposite ends of which are connected to corresponding ends of conduits 97 (Fig. 4) extending along opposite sides of the feeder and supported by brackets 98 bolted or otherwise suitably secured to the side members 7. The opposite ends of the conduits 97 are secured in conduits 97' formed in, and leading through, brackets 99 (Fig. 4) which are bolted or otherwise suitably secured to the side members 7 and conduits 97' are connected together by a conduit 100 (Figs. 2 and 4) extending transversely of the feeder.

Delivery of compressed air at the required predetermined intervals to the blow pipes 88 is effected by a valve 101 (Figs. 2 and 4) of the valve mechanism 84 and a conduit 102 having one end connected with said valve and the opposite end connected with the conduit 97' in one of the brackets 99. The valve 101 is opened and closed at proper intervals by a cam 101' fixed on and driven by the cam shaft 18.

While the upper rear portions of the pile are being winded as just described, the top sheet of the pile is engaged and lifted at the rear corners thereof by vacuum operated suction sheet separating devices the mounting, construction and operation of which are the same as the mounting, construction and operation of the vacuum operated suction sheet separating devices disclosed in application Serial Number 116,692 above referred to. These separating devices indicated broadly at 103 (Figs. 1 and 3 to 5) each includes a cylinder 104 bolted or otherwise suitably secured to one arm of a bell crank lever 105 pivotally mounted on one of the brackets 90. Each cylinder 104 has slidably mounted therein a piston (not shown) the tubular rod or stem 106 of which projects downwardly beyond the cylinder and carries on the lower end thereof a rubber suction cup 107 that is vacuum operated in opposite directions to engage and lift a rear corner of the uppermost sheet of the pile.

The upper ends of cylinders 104 have connected therewith corresponding ends of flexible conduits 108 the opposite ends of which are connected to corresponding ends of conduits 109 (Fig. 4) extending along opposite sides of the feeder and supported by the brackets 98. The opposite ends of conduits 109 are connected with conduits 109' formed in the brackets 99 and said conduits 109' are connected together by a conduit 110 (Figs. 2 and 4) extending transversely of the feeder.

Vacuum is applied at the proper time in the cylinders 104 so that the suction cups 107 are actuated in opposite directions to engage and lift the rear corners of the top sheet. This is effected by a valve 111 of the valve mechanism 84. Valve 111 has connected therewith one end of a conduit 112 the opposite end of which is connected with the conduit 110 and said valve 111 is opened and closed at proper intervals by a cam 111' that is fixed on and driven by the cam shaft 18.

After the top sheet of the pile has been lifted at the rear thereof by the suction cups 107, the lifted sheet is winded to completely separate and lift it from the next sheet therebelow. Winding of the lifted sheet is, in accordance with the present invention, accomplished by winding devices actuated in one direction by compressed air and actuated in the opposite direction by spring means. These winding devices, indicated broadly at 113 (Figs. 1 and 3 to 7), are identical as respects their mounting, construction and operation and a description of one of said devices will therefore be sufficient for both of the same. Each winding device 113 comprises an inclined cylinder 114 (Figs. 6 and 7) secured for angular adjustment, as by bolts 115, to a bracket 116 which, in turn, is bolted or otherwise suitably secured to one of the brackets 90.

Figures 6, 7:
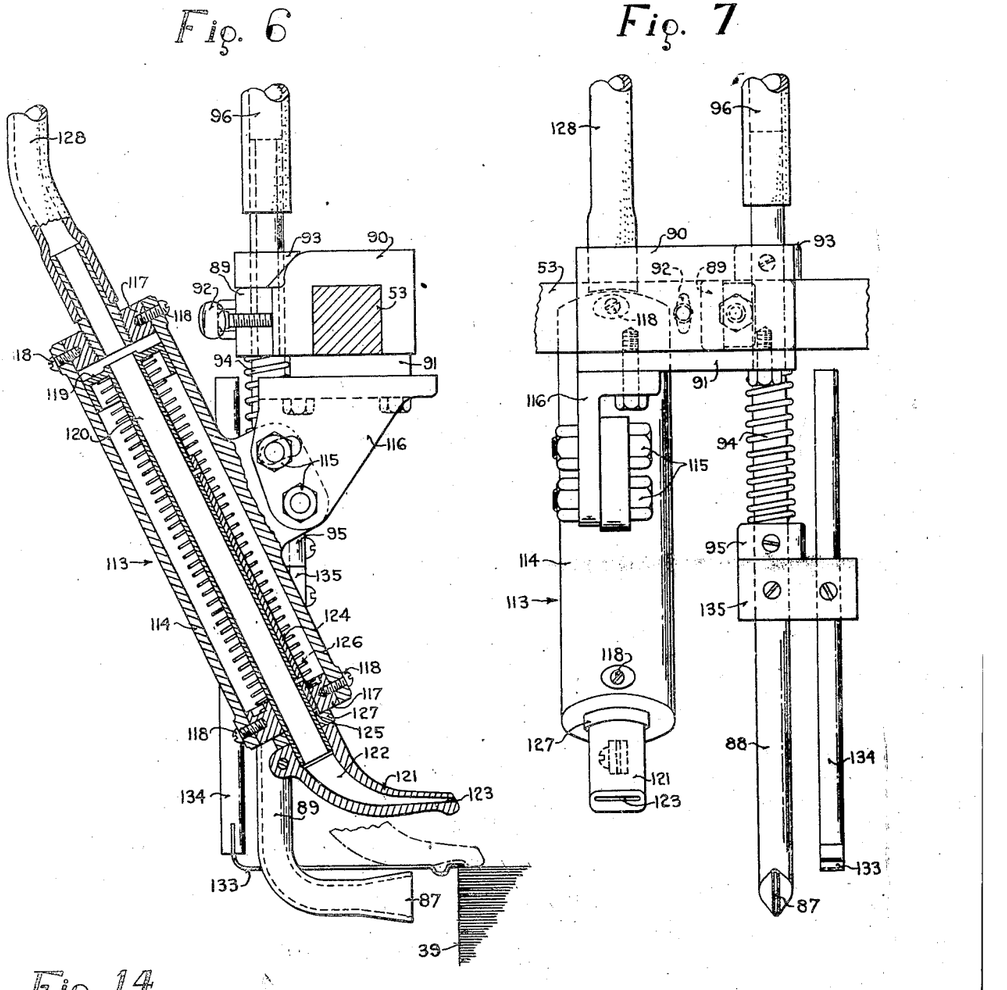
Fig. 6 is an enlarged side elevation partly in section of one of the sheet winding and pile winding units and supporting means therefor.
Fig. 7 is a front elevation of the devices and supporting means therefor illustrated in Fig. 6.
Figure 8:
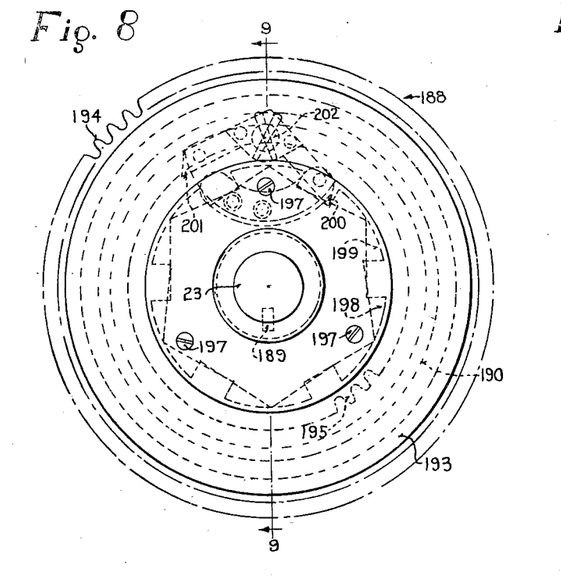
Fig. 8 is an enlarged side elevation of two speed mechanism for rapidly operating the elevator.

Each cylinder 114 is closed at its opposite ends by caps 117 held in position by machine screws 118 or the like. Slidably mounted in each cylinder 114 is a piston 119 the rod or stem of which is comprised by a tube 120 open at both ends and projecting through the lower cap 117 downwardly beyond the same. Fixed on the lower projecting end of tube 120 externally of cylinder 114 is a foot clamp 121 provided with a duct 122 in communication with said tube and decreasing in size to a restricted opening 123 at the outer end thereof as shown in Figs. 6 and 7. The tube 120 is held against rotation by a key 124 (Fig. 5) which is secured to said tube and slidable in a key way 125 formed in the lower cap 117.

Surrounding the tube 120 and interposed between the piston 119 and the bottom cap 117 of cylinder 114 is a spring 126 which is of sufficient strength to lift the piston 119, tube 120 and foot clamp 121 when the air under pressure to the cylinder 114 is shut off. In order to prevent shock and damage to the foot clamp 121 when the same is raised by the spring 126 a leather washer 127 or the like is mounted on the tube 120 between said foot clamp and the lower cap 117.

The upper ends of the cylinders 114 have connected therewith corresponding ends of flexible conduits 128 the opposite ends of which are connected with corresponding ends of conduits 129 (Fig. 4) extending along opposite sides of the feeder and supported by the brackets 98. The opposite ends of the conduits 129 are connected with conduits 129' formed in brackets 99 and said conduits 129' are connected together by a conduit 130 (Figs. 2 and 4) extending transversely of the feeder.

Delivery of compressed air at the required predetermined intervals to the cylinders 114 is effected by a valve 131 of the valve mechanism 84 and a conduit 132 having one end connected with said valve and the opposite end connected with the conduit 129' in one of the brackets 99. Valve 131 is opened and closed at proper intervals by a cam 131' that is fixed on and driven by the cam shaft 18.

When air under pressure is admitted in the cylinders 114, the air passes through the tubes 120, ducts 122, and the restricted openings 123 in the foot clamps 121. Due to the restricted openings 123 in the foot clamps 121, the amount of compressed air expelled therefrom is less than the amount of air admitted into the cylinders 114, and for this reason the excess amount of air simultaneously acts on the upper sides of the pistons 119 and forces the same downwardly together with the tubes 120 and foot clamps 121 against the tension of the springs 126 until the foot clamps engage the pile beneath the separated and lifted rear corner portions of the top sheet as shown in dotted line position in Figs. 5 and 6 of the drawings. In this position of the foot clamps 121 the air delivered therefrom between the separated and lifted uppermost sheet and the one therebelow completely separates said uppermost sheet from the pile, and the underneath sheet is held against displacement by the pressure of the foot clamps thereon maintained by the air in the cylinders 114 until the completely separated and winded sheet is moved forward through the action of devices hereinafter described at which time the source of compressed air to said cylinders is disconnected and the foot clamps 121 are raised from the pile through the expanding action of the springs 126.

In order to prevent the suction separators 103 from separating more than one sheet at a time from the pile, flexible stripper fingers 133 (Figs. 1, 3 to 6) are provided which extend over and engage the opposite corners of the pile adjacent the suction separators. These fingers 133 are secured in any suitable manner to vertically extending rods 134 (Figs. 6 and 7) adjustably secured in suitable openings in blocks 135 which are secured to the blow pipes 88.

When the uppermost sheet of the pile is separated and lifted by the suction cups 107, the rear corners thereof are pulled from beneath the fingers 133 causing said corners to bend downwardly. Should two or more sheets adhere to the suction cups 107, this bending of the sheets separates their adjacent edges and the fingers 133 engage the edges of the sheet directly beneath the uppermost sheet and hold said sheet or sheets on the pile.

To further insure against separation of more than one sheet at a time from the pile, additional means are provided which consist of fingers 136 (Figs. 1 and 3) which are adjustably secured to the separator cylinders 104. The lower ends of these fingers 136 project into the path of travel of the sheets lifted from the pile by the suction cups 107 so that if two or more sheets are simultaneously lifted from the pile by the suction cups, and the excess sheet or sheets have not been previously detached from the uppermost sheet by the stripper fingers 133, the corners of the uppermost sheet will be bent downwardly by contact of the same with the fingers 136. This bending of the corners of the sheet causes the same to slide relative to the underneath sheet thus detaching the same from said uppermost sheet and deflecting the excess sheet or sheets back onto the pile for engagement by the foot clamps 121.

When the separated and lifted sheet has been winded it is forwarded from the pile by vacuum operated oscillating suction forwarding devices located at the front of the feeder and which engage, lift and forward the separated and winded sheet to feed and drop rollers hereinafter described. These forwarding devices are indicated broadly at 137 (Figs. 1, 2, 4 and 5) and the mounting, construction and operation of said forwarding devices are the same as the mounting, construction and operation of the forwarding devices disclosed in application Serial Number 116,692 above referred to.

Each forwarding device 137 includes a cylinder 138 (Figs. 2 and 4) having a tubular stem 139 slidable therein to which is secured at the lower end thereof a rubber suction cup 140 that is vacuum operated in opposite directions to engage and lift each separated and winded sheet. Each cylinder 138 is adjustably secured, as by bolts 141, to an arm 142 that is keyed to, and slidable along, a rock shaft 143 to various positions of adjustment thereon. This rock shaft 143 extends transversely of the feeder and is journalled in in suitable bearings in brackets 144 (Fig. 5) which are bolted or otherwise suitably secured to the side bars 55. The rock shaft 143 also has a bearing in a center bracket 145 that is bolted or otherwise suitably secured to one of the stay shafts 9.

Oscillating movement is imparted to the rock shaft 143 and the sheet forwarding devices 137 carried thereby through the medium of an arm 146 (Figs. 1 and 2) that is bolted or otherwise suitably secured to said rock shaft and which is spring operated in one direction and cam operated in the opposite direction as follows. Connected with the lower end of arm 146 is one extremity of a spring 147 the opposite extremity of which is connected with a pin 148 secured in a collar 149 that is bolted or otherwise suitably secured to the upper stay shaft 9. The arm 146 has pivotally connected therewith one end of a cam strap 150 through an opening in the opposite end of which the cam shaft 18 extends. Journalled in any suitable manner on the last named end of cam strap 150 is a roller 151 which engages a cam 152 that is fixed on shaft 18 and rotated thereby. It will thus appear that as shaft 18 is rotated the cam 152 and the spring 147 will rock the arm 146 and the shaft 143 and thus impart oscillating movement to the sheet forwarding devices 137.

Connected with the cylinders 138 at the upper ends thereof are corresponding ends of flexible conduits 153 through which vacuum is established in said cylinders for actuating the suction cups 140 vertically in opposite directions to engage and lift the separated and winded sheet. The opposite ends of the flexible conduits 153 are connected with a conduit 154 (Figs. 2 and 4) extending transversely of the feeder and which is closed at both ends and secured in suitable openings in the brackets 99. The conduits 100, 110, 130 and 154 extending transversely of the feeder are connected together by a bracket 155 (Figs. 2, 4 and 5) which also serves as a support for the conduit 86.

The making and breaking of vacuum in the sheet forwarding devices 137 is controlled by a valve 156 of the valve mechanism 84. The valve 156 has connected therewith one end of a conduit 157 (Figs. 2 and 4) the opposite end of which is connected with the conduit 154, and said valve 156 is opened and closed at proper intervals by a cam 156' that is fixed on and driven by the cam shaft 18.

When the sheet forwarding devices are swung rearwardly by the described means for this purpose, vacuum is created in the cylinders 138 to draw the suction cups 140 vertically in opposite directions to engage and lift the separated and winded sheet. About this time the vacuum in the sheet separating devices 103 is broken to release the lifted rear portion of the sheet and the sheet forwarding devices are swung forward by the described means for this purpose and carry the sheet adhering to the suction cups 140 forwardly to conveying means that will be hereinafter described.

After the uppermost sheet has been forwarded from the pile, vacuum is broken in the sheet forwarding devices 137 and said sheet is received by conveying means for carrying the sheet into the machine or instrumentality with which the feeder is associated. As herein shown the conveying means is preferably operated and constructed as follows. Extending transversely of the feeder and journalled in suitable bearings in the front heads 5 is a feed roller 158 (Fig. 5) around which passes a series of conveyor tapes 159. The front portions of the tapes 159 pass around other rollers (not shown) and said tapes pass over a roller 160 (Figs. 2 and 5) that extends transversely of the feeder and is journalled on pins 161 bolted or otherwise suitably secured in the front heads 5. The tapes 159 also pass over a tubular roller 162 that extends transversely of the feeder and is journalled on tubular bearings 163 (Fig. 2) bolted or otherwise suitably secured in brackets 164. These brackets 164 are bolted or otherwise suitably secured to the pins 161 and to shaft 165 which extend transversely of the feeder and are bolted or otherwise suitably secured in the front heads.

The feed roller 158 and conveyor tapes 159 passing around said roller are driven from the continuously rotated cam shaft 18 as follows. Fixed on the cam shaft 18 is a large spur gear 166 (Fig. 2) which meshes with a smaller gear 167 that is journalled in a suitable manner on one of the front heads 5. Secured to or formed integrally with the gear 167 is a larger gear 168 which meshes with an intermediate gear 169 that is also journalled in a suitable manner on the adjacent front head 5. The gear 169 meshes with a gear 170 that is fixed on the feed roller 158 and which through the described driving connections therefor with the cam shaft 18 drives the feed roller 158 and the sheet conveying tapes 159.

Cooperating with the feed roller 158 are drop rollers 171 (Figs. 2 and 5) journalled on arms 172 fixed on a rock shaft 173 which extends transversely of the feeder and is journalled in suitable bearings in the front heads 5 and in the center bracket 19. The rock shaft 173 has fixed thereon an arm 174 carrying a roller 175 which bears against a cam 176 bolted or otherwise suitably secured to the cam shaft 18. The rock shaft 173 is rocked in one direction by a spring (not shown) and in the opposite direction by the cam 176 which results in the raising and lowering of the drop rollers 171 at pre-determined intervals. Operation of the drop rollers is so timed that they are raised when the sheet forwarding devices 137 deliver a sheet on to the feed roller 158 and the conveying tapes 159. After such delivery of the sheet and breaking of vacuum in the sheet forwarding devices 137, the drop rollers are lowered to engage the sheet and assist feeding of the same forwardly from the feeder by the feed roller 158 and the conveyor tapes 159.

The feeder is provided with a two speed mechanism for rapidly lowering and raising the elevator so that a supply of sheets may be placed on said elevator and moved into proper position for feeding. This mechanism is also utilized to reload the feeder and, in accordance with the present invention, is preferably constructed and operated as follows. Fixed on the shaft 65 at the end thereof opposite that carrying the clutch 74 and gear 72 is a part 177 of a clutch indicated broadly at 178 (Fig. 2). This clutch 178 is of well known construction needing no detailed description herein and includes another part 179 which is formed with a long solid hub 180 (Figs. 1 and 14) that is journalled in, and extends through, a suitable bearing in the adjacent front head 5 in line with the shaft 65.

Fixed on the outer end of hub 180 is a spur gear 181 (Figs. 1, 2 and 14) which meshes with a similar gear 182 journalled in any suitable manner on the adjacent front head 5. The gear 182 meshes with a similar gear 183 also journalled in any suitable manner on the adjacent front head 5. This spur gear 183 meshes with a similar gear 184 (Fig. 14) that is fixed on one end of a short shaft 185 (Fig. 2) journalled in suitable bearings in the bracket 25. Fixed on the opposite end of the short shaft 185 is a large spur gear 186 and a small spur gear 187 for driving the rotatable parts of the two speed mechanism indicated broadly at 188 (Figs. 1 to 3 and 8 to 13) for rapidly lowering and raising the elevator.

Referring to Figs. 8 to 13 this two speed mechanism 188 is preferably operated and constructed as follows. Keyed to one end of the worm shaft 23, as at 189, is a disc 190 provided at opposite sides thereof with a hub 191 and a hub 192. Rotatably mounted on the hub 191 at one side of the disc 190 is a large cylindrical casing 193 formed externally thereof with a gear 194 which meshes with the small gear 187 on the short shaft 185. Rotatably mounted on the hub 192 at the opposite side of the disc 190 is a smaller gear 195 which meshes with the large gear 186 on the short shaft 185. It will thus appear that due to the difference in diameters of the gears 194 and 187 and the gears 195 and 186, the gears 194 and 195 will be driven at different speeds. The two speed mechanism 188 is secured against endwise displacement on the worm shaft 23 by a collar 196 bolted or otherwise suitably secured to the worm shaft.

Secured to the casing 193 and to the gear 195 at opposite sides of the disc 190, as by bolts 197, are reversely disposed ratchet wheels 198 and 199 (Figs. 10 and 11) adapted to be engaged by reversely disposed pawls 200 and 201 respectively. These pawls 200 and 201 are pinned or otherwise suitably secured to the opposite ends of a stud 202 that is loosely mounted in a suitable opening 202' in the disc 190. It will thus appear that the gear 194 through engagement of the pawl 200 with the ratchet wheel 198 thereon will drive the disc 190 in one direction at a low speed, and that the gear 195 through engagement of the pawl 201 with the ratchet wheel 199 will drive the disc 190 in the opposite direction at a high speed. The low speed drive is utilized to raise the elevator with a supply of sheets to the proper feeding position, and the high speed drive is utilized to lower the elevator to the proper position to receive a supply of sheets. It is therefore necessary to lift and hold one pawl out of engagement with its respective ratchet wheel while the other pawl is in operating position. Such engagement and disengagement of the pawls 200 and 201 from the ratchet wheels 198 and 199 is effected automatically and accomplished as follows.

Secured in any suitable manner to each pawl 200 and 201 on the side thereof adjacent the disc 190 is a segmental plate 203 (Figs. 9 to 12) provided with a small opening 204 and a large opening 205. The openings 204 and 205 in one of the plates 203 are reversed so that a small opening in one plate is in line with a large opening in the opposite plate. Loosely mounted in the small openings 204 of the plates 203 are small pins 206 (Figs. 8 to 11) which are reversely disposed with respect to each other and extend through an arcuate slot 207 formed in the disc 190. These pins 206 have enlarged heads 208 that pass through the large openings 205 in the plates 203 and into frictional contact with the ratchet wheels 198 and 199 respectively. The pins 206 are held in engagement with the ratchet wheels 198 and 199 by springs 209 surrounding the same and interposed between the heads 208 and the plates 203.

Figure 10:
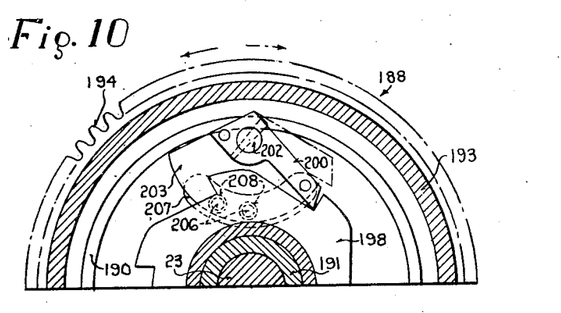
Fig. 10 is a vertical sectional view on the line 10—10 of Fig. 9 showing the low speed driving means in operating position.
Figure 11:
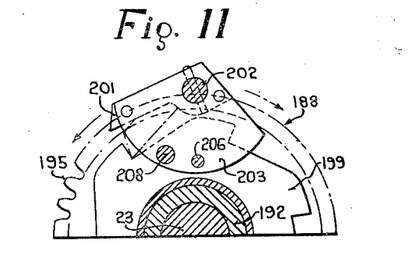
Fig. 11 is a vertical sectional view on the line 11—11 of Fig. 9 showing the high speed driving means in inoperative position.
Figure 12:
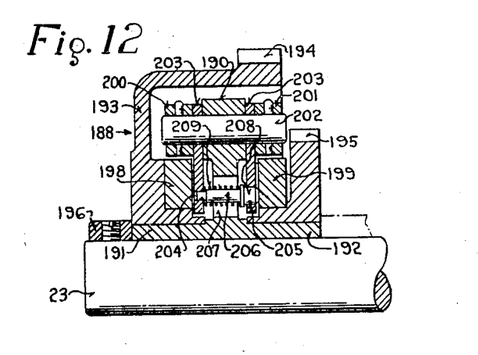
Fig. 12 is a vertical transverse sectional view similar to Fig. 9 showing the means for controlling the high speed drive.
Figure 13:
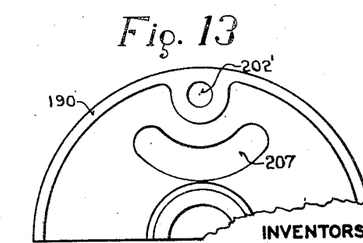
Fig. 13 is an enlarged side elevation of the elevator operating disc shown in Figs. 8 to 10 and 12.

When the gears 194 and 195 and ratchet wheels 198 and 199 thereon are rotated counterclockwise in the direction of the full line arrow indicated in Figs. 10 and 11, the pawls 200 and 201 through frictional engagement of the pins 206 with the rotating ratchet wheels 198 and 199 are rotated in a clockwise direction thus lowering the pawl 200 into engagement with the ratchet wheel 198 and raising the pawl 201 out of engagement with the ratchet wheel 199 as shown in the full line positions in Figs. 10 and 11 of the drawings. Engagement of the pawl 200 with the ratchet wheel 198 rotates the disc 190 counterclockwise which, in turn, rotates the worm shaft 23 in the proper direction to raise the elevator at low speed.

Figure 9:
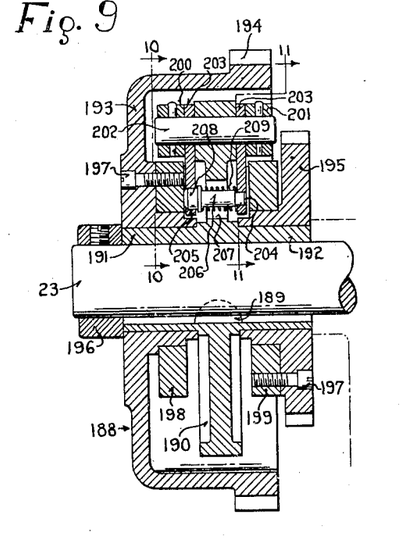
Fig. 9 is a vertical transverse sectional view on the line 9—9 of Fig. 8 showing the means for controlling the low speed drive.

When the gears 194 and 195 and ratchet wheels 198 and 199 are rotated clockwise in the direction of the dotted line arrow indicated in Figs. 10 and 11, the pawls 200 and 201 are rotated counterclockwise by the pins 206 thus raising the pawl 200 out of engagement with the ratchet wheel 198 and lowering the pawl 201 into engagement with the ratchet wheel 199 as shown in the dotted line positions in Figs. 9 and 10 of the drawings. Engagement of the pawl 201 with the ratchet wheel 199 rotates the disc 190 clockwise to lower the elevator at high speed.

As hereinbefore described, the motor 60 which drives the two speed mechanism also drives the pump 69 and when the two speed mechanism 188 is employed to rapidly raise and lower the elevator it is desirable to disconnect said pump from the motor to take the load of the pump therefrom and it is also necessary to disconnect the pawl and ratchet mechanism 26, 28 for intermittently operating the elevator. The means for connecting and disconnecting the pump, the two speed mechanism and the pawl and ratchet mechanism is preferably constructed and operated as follows. Extending transversely of the feeder through the tubular tape roller 162 and slidable in suitable bearings in the front heads 5 is a shaft 210 (Fig. 2) provided on one end thereof with spaced collars 211 having engaged therebetween the upper end of a lever 212 which is pivotally mounted on a bracket 213 that is bolted or otherwise suitably secured to one of the front heads 5. Fixed on the shaft 210 at one side thereof is a fork 214 which engages a device 215 loosely and slidably mounted on the pump drive shaft 65 for connecting and disconnecting the parts of the clutch 74. The slidable shaft 210 has also fixed thereon at the opposite side thereof a fork 216 that engages a device 217 loosely and slidably mounted on the pump shaft 65 and serving to connect and disconnect the parts of the clutch 178.

Secured in any suitable manner on the opposite end of the slidable shaft 210 is a collar 218 (Figs. 1 and 3) provided with a pin 219. This pin 219 extends into a suitable opening formed in the arm 220 of a double arm lever 221 which is pivotally mounted on a bracket 222 (Fig. 14) that is bolted or otherwise suitably secured to the bracket 25. The other arm 223 of the lever 221 is provided with a suitable opening into which extends a pin 224 secured in any suitable manner separated sheet and holding the remaining sheets of the supply against movement, means for supplying air under pressure to the movable sheet winding and holding means to wind the separated sheets, and means actuated by the air supplied under pressure to said sheet winding and holding means for moving the latter into sheet winding and holding position.

5. In a sheet feeder, means for elevating portions of a sheet to partly separate the same from a supply of sheets, means movable under the partly separated sheet for winding said sheet to further separate it from the supply, and means for pneumatically moving said movable winding means under said sheet when it has been partly separated from said supply by said first named means.

6. In a sheet feeder, means for separating a sheet from a supply of sheets, means for forwarding the separated sheet from the supply, means movable under the separated sheet into engagement with the supply for holding the remaining sheets of said supply against movement, and means for pneumatically moving said movable holding means into engagement with the supply under said sheet when the latter has been separated from said supply by said first named means.

7. In a sheet feeder, means for elevating portions of a sheet to partly separate the same from a supply of sheets, means for forwarding the sheet from the supply when said sheet has been further separated therefrom, means movable under the partly separated sheet into engagement with the supply for winding the sheet to further separate it from the supply and holding the remaining sheets of said supply against movement, and means for pneumatically moving said winding and holding means into sheet winding and holding position on the supply and under said sheet when the latter is partly separated from said supply by said first named means.

8. In a sheet feeder, means for separating sheets one after another from a supply of sheets, winding means adjacent the supply for directing a blast of air beneath each separated sheet, means supporting the winding means for movement in opposite directions toward and away from the supply, means for supplying air under pressure to the winding means, a device operated by said air for moving the winding means in one direction, and means for moving said winding means in the opposite direction.

9. In a sheet feeder, means for separating sheets one after another from a supply of sheets, means for forwarding each separated sheet from the supply, holding means adjacent the supply movable into engagement therewith under a separated sheet to prevent any sheet or sheets of the supply from being forwarded with the separated sheet, means supporting the holding means for movement in opposite directions toward and away from the supply, means for supplying air under pressure to the holding means, a device operated by said air for moving the holding means in one direction, and means for moving said holding means in the opposite direction.

10. In a sheet feeder, suction means for separating sheets one after another from the top and rear of a supply of sheets, means for forwarding each separated sheet from the supply, means normally removed from the supply adapted to engage the same beneath each separated sheet to wind said sheet and hold down the remaining sheets of said supply as the separated sheet is being forwarded, and means for pneumatically moving the last named means into engagement with the supply and under the separated sheets upon separation of each sheet from said supply.

11. In a sheet feeder, means for separating sheets one after another from a supply of sheets, means for forwarding each separated sheet from the supply, a hollow foot clamp adapted to engage the supply between the latter and each separated sheet to wind each separated sheet and prevent movement of the remaining sheets of the supply, a source of compressed air, means connected with the hollow foot clamp and the source of compressed air for delivering air under pressure through the foot clamp to wind the separated sheets, and means actuated by said air for moving said foot clamp to sheet winding and supply engaging position between said supply and each sheet separated therefrom.

12. In a sheet feeder, means for separating sheets one after another from a supply of sheets, means for forwarding each separated sheet from the supply, means adapted to engage the supply between the latter and each separated sheet to wind said sheet and prevent movement of the remaining sheets of the supply, said last named means comprising an angularly adjustable inclined cylinder, a piston slidable in said cylinder, a hollow stem connected with said piston, a hollow foot clamp secured to said stem, and means for periodically directing air under pressure into said cylinder against said piston and through said foot clamp to simultaneously engage said foot clamp with the supply and wind each sheet separated therefrom.

13. In a sheet feeder, sheet winding means movable in opposite directions toward and away from a supply of sheets, means for delivering air under pressure to the sheet winding means, means actuated by said air for moving the sheet winding means in one direction, and means for moving said sheet winding means in the opposite direction.

14. In a sheet feeder, a device for winding sheets of a supply and movable in opposite directions toward and away from the same, means for delivering air under pressure to said device, means actuated by said air for moving the device in one direction, and spring means for moving said device in the opposite direction.

15. In a sheet feeder, a device for winding sheets of a supply and movable toward and away from the same, means for delivering air under pressure to said device, means actuated by said air for pneumatically moving the device toward the supply, and means for moving the device away from the supply.

16. In a sheet feeder, a device periodically movable into engagement with a supply of sheets for preventing a succeeding sheet or sheets from being forwarded with a preceding sheet, means supporting the device for movement thereof in opposite directions toward and away from the supply across the margin thereof, means for pneumatically moving the device in one direction across the margin of the supply, and means for moving said device in the opposite direction across said margin.

17. In a sheet feeder, a foot clamp periodically movable into engagement with a supply of sheets across the margin thereof for preventing movement of a succeeding sheet or sheets with a preceding sheet, means for pneumatically moving the foot clamp into engagement with the supply across the margin thereof, and spring means for in the bracket 46 that supports the plunger housing 45. Secured to or formed integrally with the bracket 46 is a fork 225 (Fig. 14) engaging in a grove of the pawl mask 51 that is slidably as well as rotatably mounted on the worm shaft 23.

When it is desired to initially load the feeder the elevator may, for this purpose, be lowered to the proper position by moving the lever 212 to the right (Fig. 2) and starting the motor 60 so that the armature shaft 61 thereof rotates in the direction of the arrow D shown in Fig. 1 of the drawings. When the lever 212 is moved as aforesaid, the slidable shaft 210 is moved to the left (Fig. 2) and thereby moves the devices 215 and 217 to the left connecting the two parts of the clutch 178 and disconnecting the two parts of the clutch 74. At the same time, the fork 225 and the pawl mask 51 (Figs. 3 and 14) are moved to lift the pawl 26 out of engagement with the ratchet 28 if said pawl is not already disengaged therefrom.

The parts of the clutch 178 having been connected, as described, the shaft 23 is rotated clockwise as viewed in Fig. 1 through engagement of pawl 201 with the ratchet wheel 199 on the fast speed gear 195. The described connections for shaft 23 with the elevator chains 34 are then rotated so that the latter and the elevator are lowered at a fast speed. As soon as the elevator has reached the proper position for loading, the motor 60 is stopped and the elevator is loaded with a supply or pile of sheets in the usual manner.

The elevator and said pile or supply are then raised to the proper position for feeding of the sheets successively from the top of said pile or supply. This is accomplished by starting the motor 60 so that the armature shaft 61 thereof rotates in the direction of arrow U shown in Fig. 1 of the drawings. The shaft 23 is then rotated counterclockwise as viewed in Fig. 1 through engagement of the pawl 200 with the ratchet wheel 198 on the low speed gear 194 thus raising the elevator and the pile of sheets thereon until the top of the pile reaches the proper level for feeding of the sheets one after another therefrom.

At this time, the motor 60 is stopped and the lever 212 is swung to the left (Fig. 2) thus disconnecting the parts of the clutch 178 and moving the pawl mask 51 back again to its normal position. At the same time, the parts of the clutch 74 are connected to drive the pump 69. The worm shaft 23 now being disconnected from the armature shaft 61, feeding of the sheets from the top of the pile one after another may now be accomplished by starting the motor 60 so that the armature shaft 61 is rotated in the direction of the arrow D (Fig. 1). When the supply of sheets has been exhausted, the feeder may be reloaded by lowering and raising the elevator as described through the medium of the mechanism for this purpose driven from the motor 60. A hand wheel 226 is also fixed on the short shaft 185 to enable manual lowering and raising of the elevator if desired.

The operation of the feeder will be clearly understood from the foregoing description and may be briefly summarized as follows. The elevator having been loaded and the pile of sheets having been moved upwardly to proper position by the described means for this purpose, feeding of the sheets one after another from the top of the pile may be accomplished by driving the jack shaft 11 and parts connected therewith, starting the motor 60 so that the armature shaft 61 thereof rotates in the direction of the arrow D (Fig. 1) and starting the pump shaft 70 through movement of the lever 212 to the left (Fig. 2) so as to connect the parts of the clutch 74. Air under pressure supplied from the pump 69 to the blow pipes 88 is delivered through the nozzles 87 against the rear upper corner portions of the pile of sheets 39 so that said portions are winded or partially separated. The sheet separators 103, through the described connections therefor with the pump 69 then act, as before described, to engage and lift the uppermost sheet at the rear end thereof.

After the sheet has been engaged and lifted, as described, the foot clamps 121, through the described connections therefor with the pump 69, are moved downwardly into engagement with the top of the pile beneath the engaged and lifted sheet, and the engaged and lifted sheet is then winded by compressed air supplied through the foot clamps and delivered thereby between said sheet and the pile. This completely lifts and separates the sheet from the one below and the separated, lifted and winded sheet is then engaged near the front thereof by the sheet forwarding devices 137 that have been swung rearwardly by the described means for this purpose. These devices lift the sheet at the front thereof and swing forwardly, thus carrying the sheet between the driven feed roller 158 and the raised drop rollers 171 while the next sheet on the pile is held thereon by the foot clamps 121. The sheet forwarding devices then release the sheet whereupon the drop rollers are lowered thereon and the feed roller 158 and the tapes 159 carry the separated and forwarded sheet on to the machine or instrumentality with which the feeder is associated. These operations are repeated in the order named, once during each cycle of operation of the feeder, so that the sheets are fed in succession from the top of the pile to said machine or other instrumentality.

While one embodiment of the present invention is herein illustrated and described with more or less particularity, it is to be expressly understood that the invention is not limited to said embodiment or otherwise than by the terms of the appended claims.

What we claim is:

1. In a sheet feeder, means for separating sheets successively from a supply of sheets, means for forwarding each separated sheet from the supply, and pneumatically operated means movable into position under each separated sheet for holding the remaining sheets of the supply against movement.

2. In a sheet feeder, means for separating sheets successively from a supply of sheets, and pneumatically operated means movable into position under each separated sheet between the latter and said supply for winding each separated sheet.

3. In a sheet feeder, means for separating sheets successively from a supply of sheets, means for forwarding each separated sheet from the supply, movable means for winding each separated sheet, means for supplying air under pressure to the movable sheet winding means, and means actuated by the air supplied under pressure to said sheet winding means for moving the latter into sheet winding position.

4. In a sheet feeder, suction means for separating sheets successively from a supply of sheets, means for forwarding each separated sheet from the supply, movable means for winding each means for moving the device away from the supply to disengage the foot clamp therefrom.

30. In a sheet feeder, a stationary cylinder, a piston theerin, a tubular foot clamp and blow pipe disposed externally of the cylinder and connected therethrough with the piston, means connected with the cylinder for delivering air under pressure therein against the piston and through the foot clamp and blow pipe to move the latter in one direction into sheet winding and clamping position, and means for moving the piston and the foot clamp and blow pipe in the opposite direction.

31. In a sheet feeder, a stationary inclined cylinder, a piston therein, a tubular foot clamp and blow pipe disposed exteriorly of the cylinder and connected therethrough with the piston, means connected with the cylinder for delivering air under pressure therein against the piston and through the foot clamp and blow pipe to move the latter in one direction into sheet winding and clamping position, and spring means interposed between the cylinder and piston for moving the latter and the foot clamp and blow pipe in the opposite direction.

32. In a sheet feeder, suction sheet separating means, valve controlled means for making and breaking vacuum in the suction sheet separating means at proper intervals, sheet winding means movable into sheet winding position, valve controlled means for delivering compressed air through the sheet winding means at proper intervals to wind the sheets, and means actuated by said air for moving said sheet winding means into said position.

33. In a sheet feeder, suction sheet separating means and suction sheet forwarding means, valve controlled means for making and breaking vacuum in both said suction means at proper intervals, sheet winding means movable into sheet winding position, valve controlled means for delivering compressed air through the sheet winding means at proper intervals to wind the sheets, and means actuated by said air for moving said sheet winding means into said position.

34. In a sheet feeder, suction sheet separating means, sheet forwarding means, sheet holding means movable under a sheet separated from a supply into engagement with unseparated sheets thereof, valve controlled means for making and breaking vacuum in the suction sheet separating means at proper intervals, valve controlled means for delivering compressed air to the sheet holding means at proper intervals, and means actuated by said air for moving said sheet holding means under said separated sheet and into engagement with said unseparated sheets.

35. In a sheet feeder, suction sheet moving means, sheet winding and holding means, valve controlled means for making and breaking vacuum in the suction sheet moving means at proper intervals, valve controlled means for delivering compressed air through the sheet winding and holding means at proper intervals to wind a sheet moved by the suction sheet moving means relative to a supply, and means actuated by said air for moving said sheet winding and holding means into position to wind said sheet and hold the remaining sheets of said supply against movement.

JOHN H. McELROY.
FREDERICK G. BINDER.
EDWARD J. YEO.